United States Patent
Zhang et al.

(10) Patent No.: US 9,456,355 B2
(45) Date of Patent: Sep. 27, 2016

(54) SIGNALING TRACING METHOD, APPARATUS AND SYSTEM

(71) Applicant: Huawei Technologies Co., Ltd., Shenzhen, Guangdong (CN)

(72) Inventors: Hongzhuo Zhang, Shenzhen (CN); Shukun Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 239 days.

(21) Appl. No.: 14/035,564

(22) Filed: Sep. 24, 2013

(65) Prior Publication Data

US 2014/0022910 A1    Jan. 23, 2014

Related U.S. Application Data

(63) Continuation of application No. PCT/CN2012/072687, filed on Mar. 21, 2012.

(30) Foreign Application Priority Data

Mar. 24, 2011  (CN) .......................... 2011 1 0071996

(51) Int. Cl.
*H04W 24/08* (2009.01)
*H04W 88/18* (2009.01)
*H04W 24/00* (2009.01)

(52) U.S. Cl.
CPC ............. *H04W 24/00* (2013.01); *H04W 24/08* (2013.01); *H04W 88/18* (2013.01)

(58) Field of Classification Search
CPC ........ H04W 8/20; H04W 24/08; H04W 8/24
See application file for complete search history.

(56) References Cited

U.S. PATENT DOCUMENTS

| 2010/0113000 A1* | 5/2010 | Yao ........................ H04W 24/08 455/422.1 |
| 2010/0130191 A1 | 5/2010 | Li et al. |

(Continued)

FOREIGN PATENT DOCUMENTS

| CN | 101242612 A | 8/2008 |
| CN | 101330502 A | 12/2008 |

(Continued)

OTHER PUBLICATIONS

"3GPP TS 23.401—$3^{rd}$ Generation Partnership Project; Technical Specification Group Services and System Aspects; General Packet Radio Service (GPRS) enyhancements for Evolved Universal Terrestrial Radio Access Network (E-UTRAN) access (Release 10)," Version 10.3.0, $3^{rd}$ Generation Partnership Project, Valbonne, France (Mar. 2011).

(Continued)

*Primary Examiner* — Scott M Sciacca
(74) *Attorney, Agent, or Firm* — Leydig, Voit & Mayer, Ltd.

(57) ABSTRACT

The present invention discloses a signaling tracing method, apparatus and system. In embodiments of the present invention, the signaling tracing configuration information sent by an OAM device carries a user equipment identifier, and therefore, even in a scenario that an access network and a core network are managed by different OAM devices, the OAM device of the access network can also initiate signaling-based signaling tracing configuration, so that a base station can initiate signaling tracing for the user equipment.

16 Claims, 7 Drawing Sheets

(56) References Cited

U.S. PATENT DOCUMENTS

| | | | |
|---|---|---|---|
| 2010/0234019 A1* | 9/2010 | Zhang | H04W 8/04 455/432.1 |
| 2010/0272263 A1* | 10/2010 | Yao et al. | 380/270 |
| 2011/0269482 A1* | 11/2011 | Henttonen | H04W 8/10 455/456.2 |
| 2011/0319115 A1* | 12/2011 | Racz | 455/514 |
| 2012/0089876 A1* | 4/2012 | Racz et al. | 714/45 |
| 2012/0309431 A1* | 12/2012 | Bodog | H04W 16/18 455/456.6 |
| 2013/0196640 A1* | 8/2013 | Wang | H04W 4/16 455/414.1 |
| 2013/0324106 A1* | 12/2013 | Bodog | 455/422.1 |

FOREIGN PATENT DOCUMENTS

| | | |
|---|---|---|
| JP | 2010521082 A | 6/2010 |
| WO | WO 2008105699 A2 | 9/2008 |
| WO | WO 2009045138 A1 | 4/2009 |
| WO | WO 2010053727 A2 | 5/2010 |
| WO | WO 2011020440 A1 | 2/2011 |

OTHER PUBLICATIONS

"3GPP TS 32.422—3$^{rd}$ Generation Partnership Project; Technical Specification Group Services and System Aspects; Telecommunication management; Subscriber and equipment trace; Trace control and configuration management (Release 10)," Version 10.2.1, 3$^{rd}$ Generation Partnership Project, Valbonne, France (Jan. 2011).

"3GPP TS 36.413—3$^{rd}$ Generation Partnership Project; Technical Specification Group Radio Access Network; Evolved Universal Terrestrial Radio Access Network (E-UTRAN); S1 Application Protocol (S1AP) (Release 10)," Version 10.0.1, 3$^{rd}$ Generation Partnership Project, Valbonne, France (Jan. 2011).

"MDT configuration parameters," 3GPP TSG-RAN WG2 Meeting #71, Madrid, Spain, R2-104904, 3$^{rd}$ Generation Partnership Project, Valbonne, France (Aug. 23-27, 2010).

"Removing UE Capability from Minimization of Drive Tests (MDT) parameters," 3GPP TSG-SA5 (Telecom Management) SA5#75, Sorrento, Italy, S5-110527, 3$^{rd}$ Generation Partnership Project, Valbonne, France (Jan. 24-28, 2011).

International Search Report in corresponding PCT Patent Application No. PCT/CN2012/072687 (Jun. 28, 2012).

Written Opinion of the International Searching Authority in corresponding PCT Patent Application No. PCT/CN2012/072687 (Jun. 28, 2012).

* cited by examiner

SIGNALING TRACING METHOD, APPARATUS AND SYSTEM

CROSS REFERENCE TO RELATED APPLICATIONS

This application is a continuation of International Patent Application No. PCT/CN2012/072687, filed on Mar. 21, 2012, which claims priority to Chinese Patent Application No. 201110071996.1, filed on Mar. 24, 2011, both of which are hereby incorporated by reference in their entireties.

TECHNICAL FIELD

The present invention relates to the field of communication technologies and, in particular, to a signaling tracing method, apparatus and system.

BACKGROUND

To better evaluate and diagnose faults and problems in the network, a signaling tracing (Trace) technology has been put forward in the prior art. That is, a network element management system (EMS, Equipment Management System) sends parameter configurations for the signaling tracing to network element nodes, and then receives signaling tracing data returned by the network element nodes, and locates faults and problems in the network by analyzing the signaling tracing data. Further, to reduce operation costs and enhance automation functions of the network, another signaling tracing solution has been put forward based on the traditional signaling tracing method. In this signaling tracing solution, a user equipment (UE, User Equipment) is used to report parameters required for network optimization automatically. For example, in a Long Term Evolution (LTE, Long Term Evolution) project, it is called minimization of drive test (MDT, Minimization of Drive Test). In such a solution, when a network problem occurs, for example, when the user equipment fails to access a random access channel (RACH, Random Access Channel), enters a coverage hole, or encounters a network capacity problem, the user equipment records relevant network parameters automatically no matter whether the user equipment is online or offline, and reports the network parameters to a network device according to a reporting cycle configured by the network. Therefore, the network device can analyze current problems of the network device according to the network parameters reported by the user equipment, and perform the network optimization accordingly.

Currently, there are two signaling tracing configuration modes: one is a management-based signaling tracing configuration mode, and the other is a signaling-based signaling tracing configuration mode.

In the existing network architecture, a scenario that an access network and a core network may be managed by different operation administration and maintenance (OAM, Operation Administration and Maintenance) devices exists. As shown in FIG. 1a, in such a scenario, the OAM device of the access network is unable to initiate a signaling-based signaling tracing configuration mode for a specific user, but can only initiate a management-based signaling tracing configuration mode.

SUMMARY

Embodiments of the present invention provide a signaling tracing method, apparatus and system, so as to enable an OAM device of an access network to initiate both a management-based signaling tracing configuration mode and a signaling-based signaling tracing configuration mode for a specific user.

One aspect of the present invention provides a signaling tracing method, including:
receiving first signaling tracing configuration information sent by an OAM device, where the first signaling tracing configuration information carries a user equipment identifier and is used to initiate signaling tracing for a user equipment corresponding to the user equipment identifier;
sending the first signaling tracing configuration information to a first core network node;
receiving second signaling tracing configuration information sent by a serving core network node, where the second signaling tracing configuration information is obtained by the serving core network node according to the first signaling tracing configuration information provided by the first core network node; and
initiating signaling tracing for the user equipment according to the second signaling tracing configuration information sent by the serving core network node.

Another aspect of the present invention provides a signaling tracing method, including:
receiving first signaling tracing configuration information sent by a base station, where the first signaling tracing configuration information carries a user equipment identifier; and
providing the first signaling tracing configuration information to a serving core network node, so that the serving core network node provides second signaling tracing configuration information to a serving base station according to the first signaling tracing configuration information to initiate signaling tracing for a user equipment corresponding to the user equipment identifier.

Another aspect of the present invention provides a base station, including:
a collecting unit, configured to receive first signaling tracing configuration information sent by an OAM device, where the first signaling tracing configuration information carries a user equipment identifier and is used to initiate signaling tracing for a user equipment corresponding to the user equipment identifier;
a sending unit, configured to send the first signaling tracing configuration information received by the collecting unit to a first core network node;
a receiving unit, configured to receive second signaling tracing configuration information sent by a serving core network node of the user equipment, where the second signaling tracing configuration information is obtained by the serving core network node according to the first signaling tracing configuration information provided by the first core network node; and
an initiating unit, configured to initiate signaling tracing for the user equipment according to the second signaling tracing configuration information received by the receiving unit.

Another aspect of the present invention provides a core network device, including:
a receiving unit, configured to receive first signaling tracing configuration information sent by a base station, where the first signaling tracing configuration information carries a user equipment identifier; and
a processing unit, configured to provide the first signaling tracing configuration information received by the receiving unit to a serving core network node, so that the serving core network node provides second signaling tracing configuration information to a serving base station according to the first signaling tracing configuration information to initiate signaling tracing for a user equipment corresponding to the user equipment identifier.

Another aspect of the present invention provides a communication system, including any base station and any core network device that are provided in embodiments of the present invention.

In embodiments of the present invention, the signaling tracing configuration information sent by an OAM device carries a specified user equipment identifier, and therefore, even in a scenario that an access network and a core network are managed by different OAM devices, the core network node can also collect the user equipment identifier specified by the OAM device of the access network, thereby the OAM device of the access network can also initiate signaling-based signaling tracing configuration, and a serving base station can initiate signaling tracing for the user equipment.

BRIEF DESCRIPTION OF DRAWINGS

To describe the technical solutions in embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from the accompanying drawings without creative efforts.

DESCRIPTION OF EMBODIMENTS

The following clearly and comprehensively describes the technical solutions in embodiments of the present invention with reference to the accompanying drawings in embodiments of the present invention. Apparently, the described embodiments are merely a part rather than all embodiments of the present invention. All other embodiments obtained by persons of ordinary skill in the art based on embodiments of the present invention without creative efforts shall fall within the protection scope of the present invention.

Embodiments of the present invention provide a signaling tracing method, apparatus and system, as detailed below.

Figure 1A:
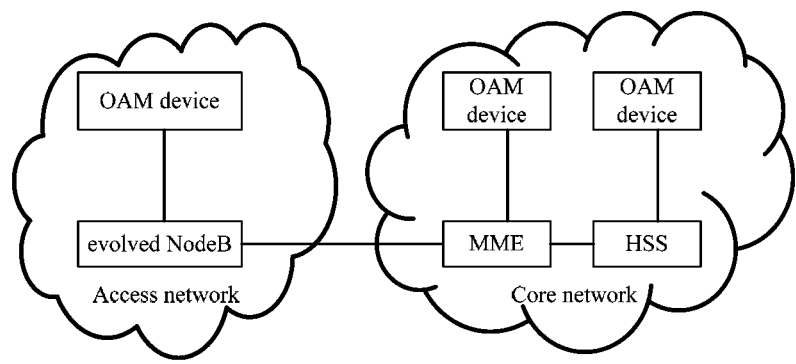
FIG. 1a is a schematic diagram of a scenario that an access network and a core network are managed by different OAM devices.
Figure 1B:
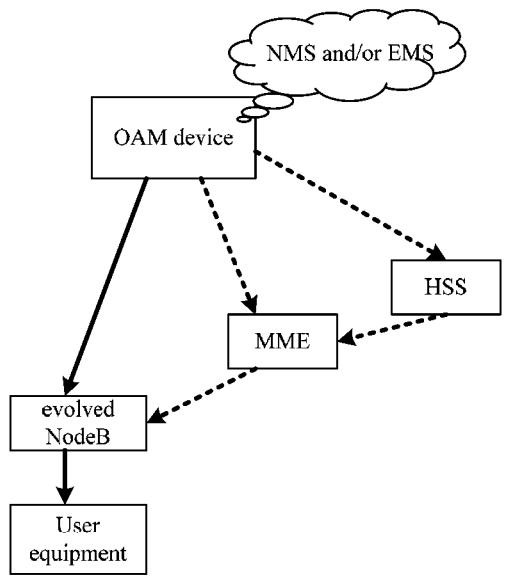
FIG. 1b is a schematic scenario diagram of an MDT configuration mode.

See FIG. 1b, which is a scenario diagram of two signaling tracing configuration modes (the management-based signaling tracing configuration mode and the signaling-based signaling tracing configuration mode), where the solid line part shows the management-based signaling tracing configuration mode, and the dotted line part shows the signaling-based signaling tracing configuration mode, which are detailed below.

In the management-based signaling tracing configuration mode, an OAM device such as a network management system (NMS, Network Management System) or a network element management system (EMS, Equipment Management System) may assign the signaling tracing configuration information to an evolved NodeB (eNB, evolved NodeB) directly. In such a configuration mode, the OAM device is unable to specify a particular user equipment to participate in the signaling tracing, but the evolved NodeB selects the user equipment randomly.

However, in the signaling-based signaling tracing mode, the OAM device may assign the signaling tracing configuration information to a core network node such as a home subscriber server (HSS, Home Subscriber Server) or a mobility management entity (MME, Mobility Management Entity), and then the core network node assigns the configuration information to the evolved NodeB. In such a configuration mode, the OAM device may use a user equipment identifier to specify a user equipment to participate in the signaling tracing.

Embodiment 1

This embodiment is described from the perspective of a base station. Specifically, the base station may be an evolved NodeB.

A signaling tracing method includes: receiving first signaling tracing configuration information carrying a user equipment identifier sent by an OAM device; sending the first signaling tracing configuration information to a first core network node; receiving second signaling tracing configuration information sent by a serving core network node; and initiating signaling tracing for the user equipment according to the second signaling tracing configuration information sent by the serving core network node.

Figure 1C:
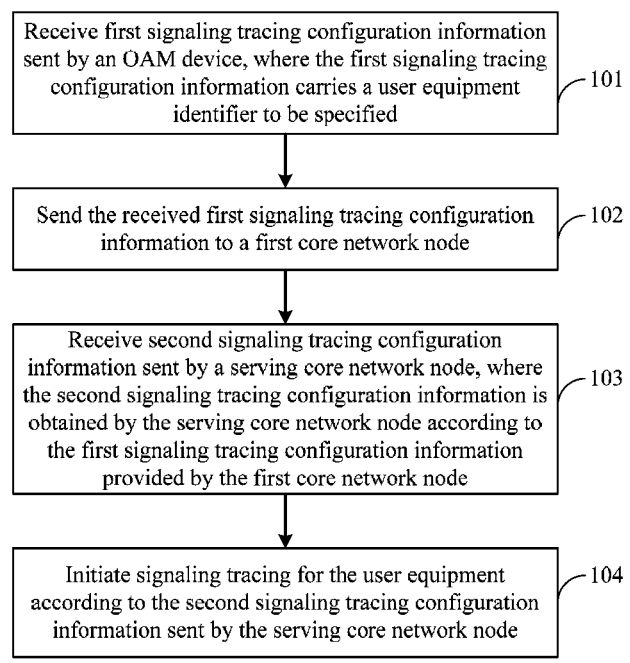
FIG. 1c is a flowchart of a signaling tracing method according to Embodiment 1 of the present invention.

As shown in FIG. 1c, the detailed process may be as follows:

Step 101: Receive first signaling tracing configuration information sent by an OAM device, where the first signaling tracing configuration information carries a user equipment identifier of a user equipment to be specified (that is, for which performing the signaling tracing is needed). For example, the user equipment identifier is an international mobile subscriber identifier (IMSI, International Mobile Subscriber Identity) or an international mobile equipment identifier (IMEI, International Mobile Equipment Identity), and so on.

The first signaling tracing configuration information may specify one user equipment, and may also specify multiple user equipments, that is, the carried identifier to be specified may be one identifier, and may also be a list including multiple user equipments, such as a list of IMSIs or IMEIs.

The first signaling tracing configuration information is used to initiate the signaling tracing for the user equipment corresponding to the user equipment identifier, and the first signaling tracing configuration information may include: a configuration parameter for performing signaling tracing, and/or, a configuration parameter for performing MDT to collect data.

Step 102: Send the received first signaling tracing configuration information to a first core network node; specifically, the first signaling tracing configuration information may be sent to all first core network nodes connected with the base station itself, and may also be sent to any one of all first core network nodes connected with the base station. For example, either of the following modes may be applied:

(1) The base station sends the first signaling tracing configuration information to the first core network node connected with the base station itself, so that the first core network node stores the first signaling tracing configuration information and/or forwards the signaling tracing configuration information to a home location register (HLR, Home Location Register)/HSS.

That is, after receiving the first signaling tracing configuration information, the first core network node may store the first signaling tracing configuration information directly, and may also forward the first signaling tracing configuration information to the HLR/HSS directly. Alternatively, the first core network node may also preprocess the first signaling tracing configuration information and then determine whether to forward it to the HLR/HSS. For example, the first core network node may determine whether a context of the user equipment to be specified exists in the first core network node, if the context exists, it indicates that the first core network node is a serving core network node of the user equipment and, thus, the core network node stores the first signaling tracing configuration information; if the context does not exist, it indicates that the core network node is not the serving core network node of the user equipment and, thus, the core network node forwards the first signaling tracing configuration information to the HSS/HLR.

(2) The base station sends the first signaling tracing configuration information to at least one first core network node connected with the base station itself, so that the first core network node that receives the first signaling tracing configuration information processes the signaling tracing configuration information, where, the processing includes:

If the context of the user equipment to be specified exists in the first core network node that receives the first signaling tracing configuration information, the first core network node that receives the first signaling tracing configuration information stores the first signaling tracing configuration information; or, if the context of the user equipment to be specified does not exist in the first core network node that receives the first signaling tracing configuration information, the first core network node that receives the first signaling tracing configuration information forwards the first signaling tracing configuration information to the HSS/HLR or the serving core network node for storing.

Because the first signaling tracing configuration information is sent to the at least one first core network node with a dedicated connection to the base station selected randomly, the first core network node that receives the first signaling tracing configuration information is not necessarily the serving core network node of the user equipment to be specified. Therefore, to ensure that the serving core network node can also obtain the first signaling tracing configuration information, the first core network node that receives the first signaling tracing configuration information needs to determine whether the core network node itself is the serving core network node. For example, the first core network node may judge whether the context of the user equipment to be specified exists in the first core network node, if the context exists, it indicates that the first core network node is the serving core network node of the user equipment and, thus, the first core network node stores the first signaling tracing configuration information for subsequent use; conversely, in an embodiment, if the context does not exist, it indicates that the first core network node is not the serving core network node of the user equipment and, thus, the core network node forwards the first signaling tracing configuration information to the HSS/HLR or the serving core network node for storing, so that the serving core network node of the user equipment can use the first signaling tracing configuration information subsequently.

Specifically, the first core network node may be an MME. The first core network node connected with the base station itself refers to a first core network node with a dedicated connection interface to the base station itself, such as an S1 connection interface.

Step 103: Receive second signaling tracing configuration information sent by a serving core network node, where the second signaling tracing configuration information is obtained by the serving core network node according to the first signaling tracing configuration information provided by the first core network node.

The second signaling tracing configuration information is provided to the serving base station for initiating the signaling tracing for the user equipment. The second signaling tracing configuration information may include: a configuration parameter for performing signaling tracing, and/or, a configuration parameter for performing MDT to collect data. It should be noted that the second signaling tracing configuration information is the same as the signaling tracing configuration information in the prior art, and the second signaling tracing configuration information differs from the first signaling tracing configuration information in that the first signaling tracing configuration information carries a user equipment identifier while the second signaling tracing configuration information may carry the user equipment identifier and may also not carry the user equipment identifier.

The first core network node and the serving core network node may be the same core network node, and may also be different core network nodes.

The serving core network node may obtain the first signaling tracing configuration information according to the user equipment identifier. For example, in step 103, if the first core network node that receives the signaling tracing configuration information sent by the base station is the serving core network node, the serving core network node may obtain corresponding first signaling tracing configuration information from the stored first signaling tracing configuration information according to the user equipment identifier directly, and then obtain the second signaling tracing configuration information according to the obtained first signaling tracing configuration information; in step 103, if the core network node that receives the first signaling tracing configuration information sent by the base station is not the serving core network node, and, if the first core network node has sent the first signaling tracing configuration information to the HSS/HLR, the serving core network node may obtain the first signaling tracing configuration information from the HSS/HLR according to the user equipment identifier, and then obtain the second signaling tracing configuration information according to the obtained first signaling tracing configuration information; in step 103, if the first core network node that receives the first signaling tracing configuration information sent by the base station is not the serving core network node, and, if the first core network node has sent the signaling tracing configuration information to the serving core network node, the serving core network node may obtain the signaling tracing configuration information from locally stored first signaling tracing configuration information according to the user equipment identifier directly, and so on. Specifically, the serving core network node may be an MME.

It should be noted that when the user equipment is active (Active), the serving base station of the user equipment may perform step 103 directly (that is, receive the second signaling tracing configuration information sent by the serving core network node); otherwise, if the user equipment is not active, for example, the user equipment is idle (IDLE) or detached (DETACH), the serving base station of the user equipment performs step 103 (that is, receives the second signaling tracing configuration information sent by the serving core network node) when the user equipment corresponding to the user equipment identifier carried in the first signaling tracing configuration information accesses the network.

Step 104: Initiate signaling tracing for the user equipment according to the second signaling tracing configuration information sent by the serving core network node.

As revealed in the foregoing description, in this embodiment, the first signaling tracing configuration information sent by an OAM device to a core network node carries a user equipment identifier, and therefore, even in a scenario that an access network and a core network are managed by different OAM devices, the core network node can also obtain the user equipment identifier specified by the OAM device of the access network, thereby the OAM device of the access network can also initiate signaling-based signaling tracing configuration, and multiple signaling tracing configuration modes are provided to the operator for selection.

Embodiment 2

This embodiment is described from the perspective of the first core network device, specifically, the first core network device may be a mobility management element such as MME.

A signaling tracing method includes: receiving first signaling tracing configuration information that carries a user equipment identifier sent by a base station; and providing the first signaling tracing configuration information to a serving core network node, so that the serving core network node provides second signaling tracing configuration information to a serving base station according to the first signaling tracing configuration information to initiate signaling tracing for a user equipment corresponding to the user equipment identifier.

Figure 2:
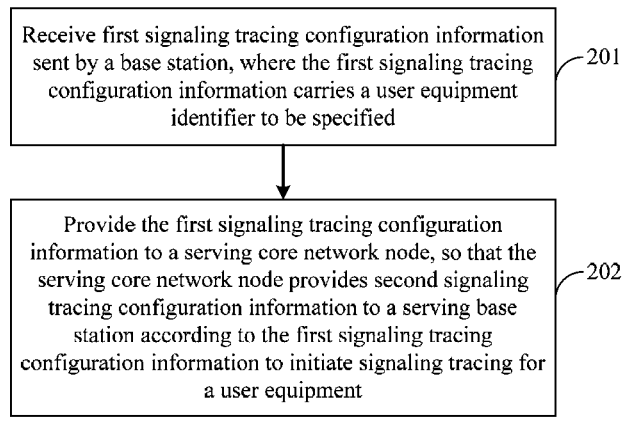
FIG. 2 is a flowchart of a signaling tracing method according to Embodiment 2 of the present invention.

As shown in FIG. 2, the detailed process may be as follows:

Step 201: Receive first signaling tracing configuration information sent by a base station, where the first signaling tracing configuration information carries a user equipment identifier of user equipment to be specified (that is, for which performing the signaling tracing is needed). For example, the user equipment identifier is an IMSI or IMEI.

At least one user equipment identifier is carried, that is, the carried user equipment identifier may be one user equipment identifier, and may also be a list of user equipment identifiers such as a list of IMSIs or IMEIs.

The first signaling tracing configuration information may include: a configuration parameter for performing signaling tracing, and/or, a configuration parameter for performing MDT to collect data.

Step 202: Provide the first signaling tracing configuration information to a serving core network node, so that the serving core network node provides second signaling tracing configuration information to a serving base station according to the first signaling tracing configuration information to initiate signaling tracing for the user equipment corresponding to the user equipment identifier. For example, after receiving the first signaling tracing configuration information, at least one of the following operations may be performed: storing the first signaling tracing configuration information; forwarding the first signaling tracing configuration information to the HLR/HSS so that the serving core network node obtains the first signaling tracing configuration information from the HLR/HSS; and forwarding the first signaling tracing configuration information to the serving core network node of the user equipment. For example, the detailed operations may be as follows:

In step 201, if the first core network node with a dedicated connection to the base station receives the first signaling tracing configuration information (that is, the serving core network node can also receive the first signaling tracing configuration information at this time), the first core network node may store the first signaling tracing configuration information directly, and may also forward the first signaling tracing configuration information to the HLR/HSS directly, and may also store the first signaling tracing configuration information and then send the signaling tracing configuration information to the HLR/HSS.

In step 201, if all first core network nodes with a dedicated connection to the base station do not receive the first signaling tracing configuration information (that is, the base station sends the first signaling tracing configuration information to one first core network which is selected randomly by the base station), in order to ensure that the serving core network node can also obtain the first signaling tracing configuration information, the first core network node that receives the signaling tracing configuration information needs to forward the first signaling tracing configuration information to the HLR/HSS, or send the first signaling tracing configuration information to the serving core network node.

Specifically, the sending the first signaling tracing configuration information to the serving core network node may be: obtaining a serving core network node identifier of the user equipment from the HSS/HLR, and sending the first signaling tracing configuration information to the serving core network node according to the obtained serving core network node identifier.

Optionally, before the sending, the first core network node that receives the first signaling tracing configuration information may judge whether the first core network node itself is the serving core network node; and, if the first core network node is the serving core network node, the forwarding may not be performed. That is, the method may further include:

determining whether a context of the user equipment exists in the first core network node.

In this case, specifically, the storing the first signaling tracing configuration information may include: storing the first signaling tracing configuration information if it is determined that the context of the user equipment exists in the first core network node.

Specifically, the forwarding the first signaling tracing configuration information to the HLR/HSS may include: forwarding the first signaling tracing configuration information to the HSS/HLR if it is determined that the context of the user equipment does not exist in the first core network node for the HSS/HLR storing the first signaling tracing configuration information.

Specifically, the forwarding the first signaling tracing configuration information to the serving core network node may be: forwarding the first signaling tracing configuration information to the serving core network node if it is determined that the context of the user equipment does not exist in the first core network node. For example, the first core network node may obtain a serving core network node identifier of the user equipment from the HSS/HLR, and send the first signaling tracing configuration information to the serving core network node according to the obtained serving core network node identifier for the serving core network node storing the first signaling tracing configuration information.

In this way, when the user equipment corresponding to the user equipment identifier accesses the network, the device storing the first signaling tracing configuration information may provide the first signaling tracing configuration information to the serving base station, so that the serving base station initiates signaling tracing for the user equipment. For example, the process may be as follows:

When the user equipment corresponding to the user equipment identifier accesses the network, if the serving core network node of the user equipment itself stores the corresponding first signaling tracing configuration information, the serving core network node sends the second signaling tracing configuration information to the serving base station according to the first signaling tracing configuration information directly; if the serving core network node itself does not store the corresponding first signaling tracing configuration information, the serving core network node may obtain the first signaling tracing configuration information from the HSS/HLR, and then send the second signaling tracing configuration information to the serving base station according to the obtained first signaling tracing configuration information. The second signaling tracing configuration information may be extracted from the first signaling tracing configuration information and, specifically, the method for sending the second signaling tracing configuration information to the serving base station may be as follows:

When the user equipment is active, the serving core network node sends an S1 application protocol message carrying the second signaling tracing configuration information to the base station through an S1 connection of the user equipment, so that the base station initiates signaling tracing for the user equipment; and When the user equipment is idle (IDLE) or detached (DETACH), after an activation message sent by the user equipment is received, the serving core network node sends an S1 application protocol (S1AP, S1 Application Protocol) message carrying the second signaling tracing configuration information to the base station through the S1 connection of the user equipment, so that the base station initiates signaling tracing for the user equipment.

Specifically, the activation message may be a network access service request (Service Request) message or a network access attach (ATTACH) message. Specifically, the core network node may be an MME.

As revealed in the foregoing description, in this embodiment, the first signaling tracing configuration information sent by an OAM device carries a user equipment identifier to be specified, and therefore, even in a scenario that an access network and a core network are managed by different OAM devices, the core network node can also collect the user equipment identifier to be specified by the OAM device of the access network, thereby the OAM device of the access network can also initiate signaling-based signaling tracing configuration, and multiple signaling tracing configuration modes are provided to the operator for selection.

Embodiment 3

According to the method described in the preceding embodiments, the following will give more details in Embodiments 3 to 5 using examples. For ease of description, in the following embodiments, it is assumed that the first core network node and the serving core network node are MMEs, and that the base station is an evolved NodeB. Understandably, such methods are also applicable to other network devices of the core network with functions similar to the MME.

In the embodiment, it is assumed that the evolved NodeB sends the signaling tracing configuration information to all MMEs connected with the evolved NodeB, and the first signaling tracing configuration information and the second signaling tracing configuration information are configuration parameters for performing MDT to collect data.

Figure 3:
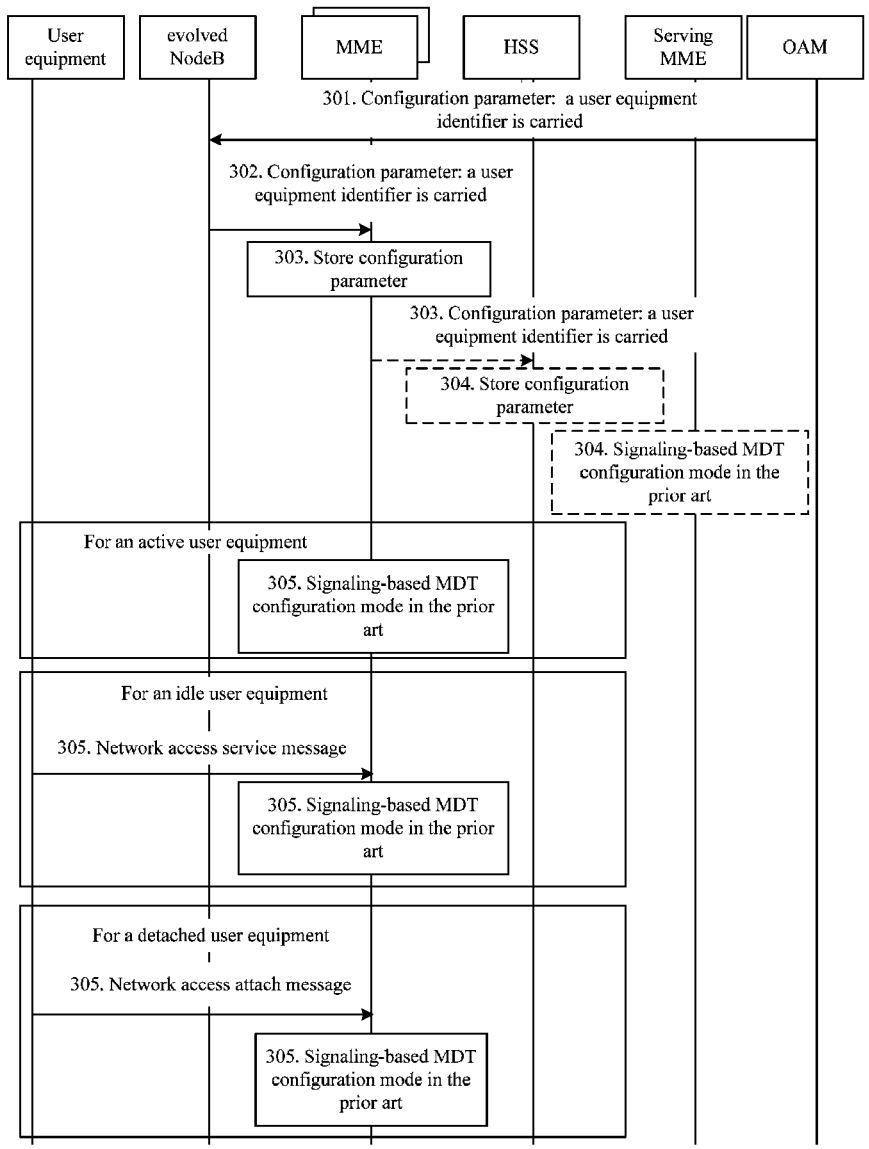
FIG. 3 is a flowchart of a signaling tracing method according to Embodiment 3 of the present invention.

As shown in FIG. 3, the detailed process may be as follows:

For ease of description, in FIG. 3, the configuration parameter for performing MDT data collecting is briefly called configuration parameter.

Step 301: If an OAM device of an access network needs to specify a certain user equipment to participate in an MDT, the OAM device of the access network may send a configuration parameter for performing MDT to collect data to an evolved NodeB, where, the configuration parameter for performing MDT to collect data carries a user equipment identifier to be specified, such as IMSI or IMEI.

It should be noted that the specified user equipment may be one or more user equipments. That is, the carried user equipment identifier may be one user equipment identifier, and may also be a list of user equipment identifiers, such as a list of IMSIs or IMEIs.

Step 302: After receiving the configuration parameter for performing MDT to collect data, the evolved NodeB sends the configuration parameter for performing MDT to collect data to all MMEs that have S1 connections to the evolved NodeB through S1 application protocol messages.

Step 303: After receiving the configuration parameter for performing MDT to collect data forwarded by the eNB, the MME stores the configuration parameter for performing MDT to collect data, or forwards the configuration parameter for performing MDT to collect data to an HSS connected with the MME, or stores the configuration parameter for performing MDT to collect data and then forwards the configuration parameter for performing MDT to collect data to the HSS connected with the MME.

Step 304: If the MME forwards the configuration parameter for performing MDT to collect data to the HSS, the HSS stores the configuration parameter for performing MDT to collect data, and then, when the user equipment accesses the network, assigns the configuration parameter for performing MDT to collect data to the specified user equipment according to a signaling-based MDT configuration mode provided in the prior art. For example, the detailed operations may be as follows:

When the user equipment accesses the network, the user equipment sends an attach request to the network, and updates its own (that is, the user equipment's) location information in the HSS. The HSS checks whether the user equipment is needed to be traced according to the user equipment identifier, that is, determines whether the user equipment identifier is consistent with the stored user equipment identifier to be specified, if the tracing is not needed, the process ends; if the tracing is needed, the HSS sends the configuration parameters for performing MDT to collect data to a serving MME of the user equipment, for example, the HSS may send the configuration parameter for performing MDT to collect data to the serving MME of the user equipment by carrying the configuration parameter for performing MDT to collect data in a location update response message, and the serving MME sends the configuration parameter for performing MDT to collect data to a serving evolved NodeB through an S1 connection path of the user equipment. As described in step 305, the serving evolved NodeB assigns the configuration parameter for performing MDT to collect data to the user equipment through the S1 connection path of the user equipment, and instructs the user equipment to perform drive test data measurement.

The process of the signaling-based MDT configuration mode covered in the prior art may referring to the prior art, and is not detailed here any further.

Step 305: If the MME does not forward the configuration parameter for performing MDT to collect data to the HSS, the MME may perform the following operations directly when the user equipment accesses the network:

(1) For an active user equipment:

The MME assigns the configuration parameter for performing MDT to collect data to the specified user equipment according to a signaling-based MDT configuration mode provided in the prior art. For example, the following operations may be performed:

If determining that the MME itself is a serving MME of the user to be specified, the MME sends an S1 application protocol message such as a Trace Start (Trace start) message to the serving evolved NodeB through an S1 connection of the user, where the S1 application protocol message carries the configuration parameter for performing MDT to collect data.

After receiving the configuration parameter for performing MDT to collect data, the serving evolved NodeB assigns the configuration parameter for performing MDT to collect data to the user equipment through the S1 connection of the user equipment, and instructs the user equipment to perform drive test data measurement.

It should be noted that, in this case, the "configuration parameter for performing MDT to collect data" sent by the MME to the serving evolved NodeB may carry no user equipment identifier, and, the serving evolved NodeB may identify the user equipment to be traced currently by other means. For example, when the user equipment corresponding to the user equipment identifier accesses the network, the serving evolved NodeB allocates an evolved NodeB S1 application protocol message identifier (eNB S1-AP ID) to the user equipment, and notices the eNB S1-AP ID to the serving MME of the user equipment in the S1 application protocol message, so that the serving MME allocates an MME application protocol message identifier (MME S1-AP ID) to the user equipment, and notices the MME S1-AP ID to the serving evolved NodeB in a downlink S1 application protocol message. In this way, when the serving MME sends a message to the serving evolved NodeB subsequently, the eNB S1-AP ID may be carried in the message, so that the serving evolved NodeB knows performing signaling tracing for which user equipment.

(2) For an idle (IDLE) user equipment:

When the user equipment sends a Service Request (network access service request) message to the MME, the MME is activated and, at this time, the active MME assigns the configuration parameter for performing MDT to collect data to the specified user equipment according to the signaling-based MDT configuration mode provided in the prior art. For example, the following operations may be performed:

The active MME sends the configuration parameter for performing MDT to collect data to the evolved NodeB that covers the user equipment, that is, the serving evolved NodeB.

After receiving the configuration parameter for performing MDT to collect data, the serving evolved NodeB assigns the configuration parameter for performing MDT to collect data to the user equipment through an S1 connection of the user equipment, and instructs the user equipment to perform drive test data measurement.

It should be noted that, in this case, the "configuration parameter for performing MDT to collect data" sent by the MME to the serving evolved NodeB may carry no user equipment identifier, and, the serving evolved NodeB may identify the user equipment to be traced currently by other means. See the description in section (1) in this embodiment.

(3) For a detached (DETACH) user equipment:

When the user equipment sends a ATTACH (network access attach) message to the MME, the MME is activated and, at this time, the active MME assigns the configuration parameter for performing MDT to collect data to the specified user equipment according to the signaling-based MDT configuration mode provided in the prior art. For example, the following operations may be performed:

The active MME sends the configuration parameter for performing MDT to collect data to the evolved NodeB that covers the user equipment, that is, the serving evolved NodeB.

After receiving the configuration parameter for performing MDT to collect data, the serving evolved NodeB assigns the configuration parameter for performing MDT to collect data to the user equipment through an S1 connection of the user equipment, and instructs the user equipment to perform drive test data measurement.

Afterward, the user equipment may send a drive test data configuration completion message to the serving evolved NodeB, and reports the drive test data to the serving evolved NodeB. The serving evolved NodeB sends the drive test data to a data collection entity for analyzing, evaluating, or diagnosing.

It should be noted that, in this case, the "configuration parameter for performing MDT to collect data" sent by the MME to the serving evolved NodeB may carry no user equipment identifier, and, the serving evolved NodeB may identify the user equipment to be traced currently by other means. See the description in section (1) in this embodiment.

Besides, for ease of description, in this embodiment, it is assumed that the evolved NodeB which sends the configuration parameter for performing MDT to collect data to the MME is the serving evolved NodeB (that is, the same evolved NodeB). Understandably, the evolved NodeB which sends the configuration parameter for performing MDT to collect data to the MME may also be an evolved NodeB different from the serving evolved NodeB.

Besides, it should be noted that the MDT is taken as an example merely in this embodiment, it is understandable that, the method is also applicable to a traditional Trace (that is, signaling tracing) solution, in this case, specifically, the signaling tracing configuration information is configuration parameters for performing signaling tracing, which is not detailed here any further. Besides, it should be noted that, in a Trace (that is, signaling tracing) solution, the serving evolved NodeB does not need to assign the configuration parameters for performing the signaling tracing to the user equipment, the details may referring to the prior art.

As revealed in the foregoing description, in this embodiment, the configuration parameter for performing MDT to collect data sent by an OAM device carry a user equipment identifier to be specified, and therefore, even in an scenario that an access network and a core network are managed by different OAM devices, the core network node can also collect the user equipment identifier to be specified by the OAM device of the access network, thereby the OAM device of the access network can also initiate signaling-based MDT configuration, and multiple MDT configuration modes are provided to the operator for selecting.

Embodiment 4

In this embodiment, it is assumed that the evolved NodeB sends the signaling tracing configuration information to one of all the MMEs connected with the evolved NodeB, and the tracing configuration information is configuration parameter for performing MDT to collect data.

Figure 4:
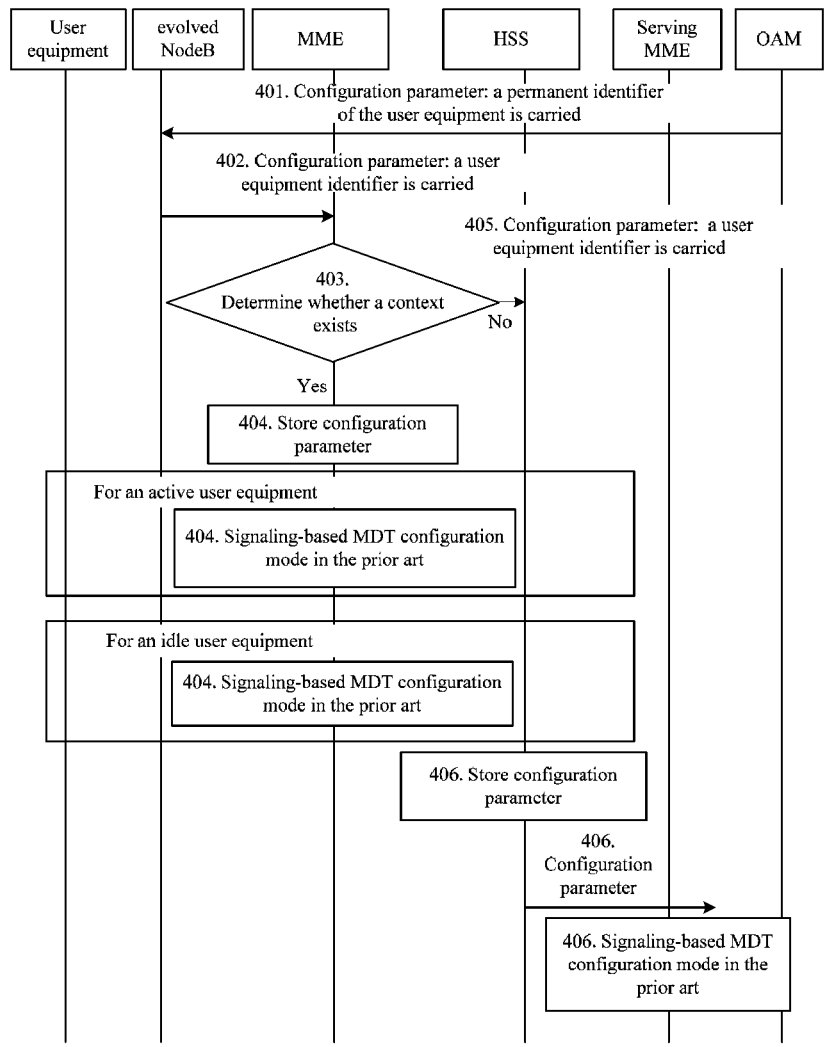
FIG. 4 is a flowchart of a signaling tracing method according to Embodiment 4 of the present invention.

As shown in FIG. 4, the detailed process may be as follows:

For ease of description, in FIG. 4, the configuration parameter for performing MDT to collect data is briefly called configuration parameter.

Step 401: If an OAM device of an access network needs to specify a certain user equipment to participate in an MDT, the OAM device of the access network may send configuration parameter for performing MDT to collect data to an evolved NodeB. The configuration parameter for performing MDT to collect data carries a user equipment identifier to be specified, such as IMSI or IMEI.

It should be noted that the specified user equipment may be one or more user equipments. That is, the carried user equipment identifier may be one user equipment identifier, and may also be a list of user equipment identifiers such as a list of IMSIs or IMEIs.

Step 402: After receiving the configuration parameter for performing MDT to collect data, the evolved NodeB sends the configuration parameter for performing MDT to collect data to one of all the MMEs that have an S1 connection to the evolved NodeB randomly through an S1 application protocol message.

Step 403: After receiving the configuration parameter for performing MDT to collect data forwarded by the evolved NodeB, the MME judges whether a context of the specified user equipment exists in the MME, if the context exists, the process proceeds to step 404; if the context does not exist, the process proceeds to step 405.

Step 403 is optional. Apart from step 403, after receiving the configuration parameter for performing MDT to collect data forwarded by the evolved NodeB, the MME may forward the configuration parameter for performing MDT to collect data to the HSS directly, the HSS stores the configuration parameter for performing MDT to collect data, and then assigns, the configuration parameter for performing MDT to collect data to the specified user equipment according to the signaling-based MDT configuration mode provided in the prior art. For details, see step 304 in Embodiment 3.

Step 404: If a context of the specified user equipment exists in the MME, the MME stores the configuration parameter for performing MDT to collect data.

In this case, the MME may forward the configuration parameter for performing MDT to collect data to the HSS connected with the MME, or may forward no configuration parameter for performing MDT to collect data to the HSS connected with the MME.

If the MME forwards the configuration parameter for performing MDT to collect data to the HSS, the HSS stores the configuration parameter for performing MDT to collect data, and then, when the user equipment accesses the network, assigns the configuration parameter for performing MDT to collect data to the specified user equipment according to the signaling-based MDT configuration mode provided in the prior art. For details, see step 304 in Embodiment 3.

If the MME does not forward the configuration parameter for performing MDT to collect data to the HSS, the following operations may be performed:

(1) For an active user equipment:

The MME assigns the configuration parameter for performing MDT to collect data to the specified user equipment according to a signaling-based MDT configuration mode provided in the prior art. For example, the following operations may be performed:

If determining that the MME itself is a serving MME of the user to be specified, the MME sends an S1 application protocol message such as a Trace Start (Trace start) message to the serving evolved NodeB through an S1 connection of the user, where the S1 application protocol message carries the configuration parameter for performing MDT to collect data.

After receiving the configuration parameter for performing MDT to collect data, the serving evolved NodeB assigns the configuration parameter for performing MDT to collect data to the user equipment through an S1 connection of the user equipment, and instructs the user equipment to perform drive test data measurement.

It should be noted that, in this case, the "configuration parameter for performing MDT to collect data" sent by the MME to the serving evolved NodeB may carry no user equipment identifier, and, the serving evolved NodeB may identify the user equipment to be traced currently by other means. See the description in section (1) in Embodiment 3.

(2) For an idle (IDLE) user equipment:

When the user equipment sends a Service Request NAS message to the MME, the MME is activated and, at this time, the active MME assigns the configuration parameter for performing MDT to collect data to the specified user equipment according to the signaling-based MDT configuration mode provided in the prior art. For example, the following operations may be performed:

The active MME sends the configuration parameter for performing MDT to collect data to the evolved NodeB that covers the user equipment, that is, the serving evolved NodeB.

After receiving the configuration parameter for performing MDT to collect data, the serving evolved NodeB assigns the configuration parameter for performing MDT to collect data to the user equipment through a dedicated S1 connection of the user equipment, and instructs the user equipment to perform drive test data measurement.

It should be noted that, in this case, the "configuration parameter for performing MDT to collect data" sent by the MME to the serving evolved NodeB may carry no user equipment identifier, and, the serving evolved NodeB may identify the user equipment to be traced currently by other means. See the description in section (1) in Embodiment 3.

Step 405: If no context of the specified user equipment exists in the MME, the MME forwards the configuration parameter for performing MDT to collect data to an HSS connected to the MME, and then performs step 406.

Step 406: The HSS stores the configuration parameter for performing MDT to collect data, and then, when the user equipment accesses the network, assigns the configuration parameter for performing MDT to collect data to the specified user equipment according to the signaling-based MDT configuration mode provided in the prior art. For details, see step 304 in Embodiment 3.

Afterward, the user equipment may send a drive test data configuration completion message to the serving evolved NodeB, and reports the drive test data to the serving evolved NodeB. The serving evolved NodeB sends the drive test data to a data collection entity for analyzing, evaluating, or diagnosing.

It should be noted that, for ease of description in this embodiment, it is assumed that the evolved NodeB which sends the configuration parameter for performing MDT to collect data to the MME is the serving evolved NodeB (that is, the same evolved NodeB). Understandably, the evolved NodeB which sends the configuration parameter for performing MDT to collect data to the MME may also be an evolved NodeB different from the serving evolved NodeB.

Besides, it should be noted that the MDT is taken as an example merely in this embodiment, it is understandable that, the method is also applicable to a traditional Trace (that is, signaling tracing) solution, in this case, specifically, the signaling tracing configuration information is configuration parameters for performing signaling tracing, which is not detailed here any further. Besides, it should be noted that, in a Trace (that is, signaling tracing) solution, the evolved NodeB does not need to assign the configuration parameters for performing the signaling tracing to the user equipment, the details may referring to the prior art.

As revealed in the foregoing description, in this embodiment, the configuration parameter for performing MDT to collect data sent by an OAM device carry a user equipment identifier to be specified, and therefore, even in a scenario that an access network and a core network are managed by different OAM devices, the core network node can also collect the user equipment identifier to be specified by the OAM device of the access network, thereby the OAM device of the access network can also initiate signaling-based MDT configuration, and multiple MDT configuration modes are provided to the operator for selecting.

Embodiment 5

Similar to Embodiment 4, this embodiment also assumes that the evolved NodeB sends the signaling tracing configuration information to one of all the MMEs connected with the evolved NodeB. This embodiment differs from Embodiment 4 in that the MME send the received signaling tracing configuration information to the serving MME rather than the HSS.

Figure 5:
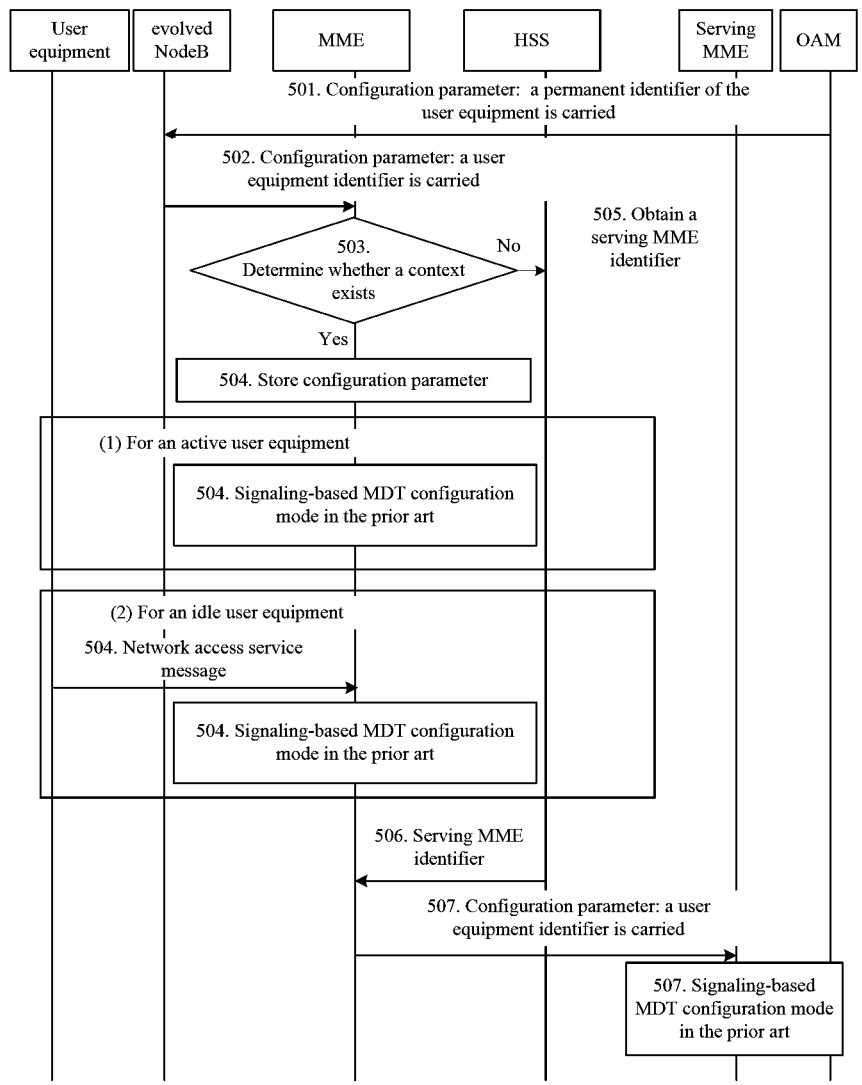
FIG. 5 is a flowchart of a signaling tracing method according to Embodiment 5 of the present invention.

Assuming that the signaling tracing configuration information is configuration parameter for performing MDT to collect data, as shown in FIG. 5, the detailed process may be as follows:

For ease of description, in FIG. 5, the configuration parameter for performing MDT to collect data is briefly called configuration parameter.

Step 501: If an OAM device of an access network needs to specify a certain user equipment to participate in an MDT, the OAM device of the access network may send signaling tracing configuration information such as configuration parameter for performing MDT to collect data to an evolved NodeB. The configuration parameter for performing MDT to collect data carries a user equipment identifier to be specified, such as IMSI or IMEI.

It should be noted that the specified user equipment may be one or more user equipments. That is, the carried user equipment identifier may be one user equipment identifier, and may also be a list of user equipment identifiers such as a list of IMSIs or IMEIs.

Step 502: After receiving the configuration parameter for performing MDT to collect data, the evolved NodeB sends the configuration parameter for performing MDT to collect data to one of all the MMEs that have an S1 connection to the evolved NodeB randomly through an S1 application protocol message.

Step 503: After receiving configuration parameter for performing MDT to collect data forwarded by the evolved NodeB, the MME judges whether a context of the specified user equipment exists in the MME, if the context exists, the process proceeds to step 504; if the context does not exist, the process proceeds to step 505.

Step 504: If a context of the specified user equipment exists in the MME, the MME stores t configuration parameter for performing MDT to collect data.

In this case, the MME may forward the configuration parameter for performing MDT to collect data to the HSS connected with the MME, or may forward no configuration parameter for performing MDT to collect data to the HSS connected with the MME.

If the MME forwards the configuration parameter for performing MDT to collect data to the HSS, the HSS stores the configuration parameter for performing MDT to collect data, and then, when the user equipment accesses the network, assigns the configuration parameter for performing MDT to collect data to the specified user equipment according to the signaling-based MDT configuration mode provided in the prior art. For details, see step 304 in Embodiment 3.

If the MME does not forward the configuration parameter for performing MDT to collect data to the HSS, the following operations may be performed:

(1) For an active user equipment:

The MME assigns the configuration parameter for performing MDT to collect data to the specified user equipment according to a signaling-based MDT configuration mode provided in the prior art. For example, the following operations may be performed:

If determining that the MME itself is a serving MME of the user to be specified, the MME sends an S1 application protocol message such as a Trace Start (Trace start) message to the serving evolved NodeB through a dedicated S1 connection of the user, where the S1 application protocol message carries the configuration parameter for performing MDT to collect data.

After receiving the configuration parameter for performing MDT to collect data, the evolved NodeB assigns the configuration parameter for performing MDT to collect data to the user equipment through a dedicated S1 connection of the user equipment, and instructs the user equipment to perform drive test data measurement.

It should be noted that, in this case, the "configuration parameter for performing MDT to collect data" sent by the MME to the serving evolved NodeB may carry no user equipment identifier, and, the serving evolved NodeB may identify the user equipment to be traced currently by other means. See the description in section (1) in Embodiment 3.

(2) For an idle (IDLE) user equipment:

The configuration parameter for performing MDT to collect data is assigned to the specified user equipment according to a signaling-based MDT configuration mode provided in the prior art. For example, the following operations may be performed:

When the user equipment sends a Service Request NAS message to the MME, the MME is activated. In this case, the active MME sends the configuration parameter for performing MDT to collect data to the evolved NodeB that covers the user equipment, that is, the serving evolved NodeB.

After receiving the configuration parameter for performing MDT to collect data, the serving evolved NodeB assigns the configuration parameter for performing MDT to collect data to the user equipment through a dedicated S1 connection of the user equipment, and instructs the user equipment to perform drive test data measurement.

It should be noted that, in this case, the "configuration parameter for performing MDT to collect data" sent by the MME to the serving evolved NodeB may carry no user equipment identifier, and, the serving evolved NodeB may identify the user equipment to be traced currently by other means. See the description in section (1) in Embodiment 3.

Step 505: If no context of the specified user equipment exists in the MME, the MME obtains from an HSS an MME identifier of a serving MME of the specified user equipment, which is called a serving MME identifier, and then performs step 506.

Step 506: The HHS sends the serving MME identifier to the MME, and then performs step 507.

Step 507: After receiving the serving MME identifier, the MME sends the configuration parameter for performing MDT to collect data to the MME corresponding to the serving MME identifier (that is, the serving MME of the specified user equipment); after receiving the configuration parameter for performing MDT to collect data, the serving MME stores the configuration parameter for performing MDT to collect data. Subsequently, when the user equipment accesses the network, the operations described in section (1) or (2) in step 504 are performed.

Afterward, the user equipment may send a drive test data configuration completion message to the serving evolved NodeB, and reports the drive test data to the serving evolved NodeB. The serving evolved NodeB sends the drive test data to a data collection entity for analyzing, evaluating, or diagnosing.

It should be noted that for ease of description in this embodiment, it is assumed that the evolved NodeB which sends the configuration parameter for performing MDT to collect data to the MME is the serving evolved NodeB (that is, the same evolved NodeB). Understandably, the evolved NodeB which sends the configuration parameter for performing MDT to collect data to the MME may also be an evolved NodeB different from the serving evolved NodeB.

Besides, it should be noted that the MDT is taken as an example merely in this embodiment, it is understandable that, the method is also applicable to a traditional Trace (that is, signaling tracing) solution, in this case, specifically, the signaling tracing configuration information is configuration parameters for performing signaling tracing, which is not detailed here any further. Besides, it should be noted that, in a Trace (that is, signaling tracing) solution, the evolved NodeB does not need to assign the configuration parameters for performing the signaling tracing to the user equipment, the details may referring to the prior art.

As revealed in the foregoing description, in this embodiment, the configuration parameter for performing MDT to collect data sent by an OAM device carry a user equipment identifier to be specified, and therefore, even in a scenario that an access network and a core network are managed by different OAM devices, the core network node can also collect the user equipment identifier to be specified by the OAM device of the access network, thereby the OAM device of the access network can also initiate signaling-based MDT configuration, and multiple MDT configuration modes are provided to the operator for selecting.

Embodiment 6

Figure 6:
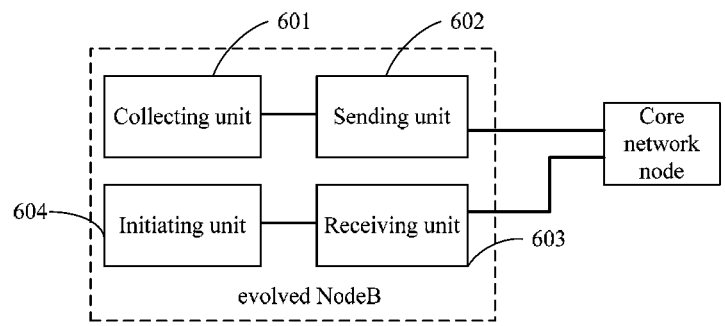
FIG. 6 is a schematic structural diagram of a base station according to an embodiment of the present invention.

To better implement the foregoing methods, a base station is provided in embodiments of the present invention correspondingly. As shown in FIG. 6, the base station includes a collecting unit 601, a sending unit 602, a receiving unit 603, and an initiating unit 604.

The collecting unit 601 is configured to receive first signaling tracing configuration information sent by an OAM device, where the first signaling tracing configuration information may be used to initiate signaling tracing for a user equipment corresponding to a user equipment identifier, where the first signaling tracing configuration information carries the user equipment identifier such as an IMSI or IMEI.

At least one user equipment identifier is carried, that is, the carried user equipment identifier may be one user equipment identifier, and may also be a list of user equipment identifiers such as a list of IMSIs or IMEIs.

The sending unit 602 is configured to send the first signaling tracing configuration information received by the collecting unit 601 to a first core network node.

The receiving unit 603 is configured to receive second signaling tracing configuration information sent by a serving core network node, where the second signaling tracing configuration information is obtained by the serving core network node according to the first signaling tracing configuration information provided by the first core network node.

For example, when the user equipment is active, the receiving unit 603 may perform the step of receiving the second signaling tracing configuration information sent by the serving core network node directly; otherwise, if the user equipment is not active, for example, the user equipment is idle or detached, the receiving unit 603 performs the step of receiving the second signaling tracing configuration information sent by the serving core network node when the user equipment corresponding to the user equipment identifier carried in the first signaling tracing configuration information accesses the network.

The initiating unit 604 is configured to initiate signaling tracing for the user equipment according to the second signaling tracing configuration information received by the receiving unit.

Specifically, the sending unit 602 may send the first signaling tracing configuration information to a first core network node connected with the base station itself, and may also send the first signaling tracing configuration information to at least one first core network node connected with the base station itself. That is:

The sending unit 602 is specifically configured to send the first signaling tracing configuration information to the first core network node connected with the base station itself, so that the first core network node stores the first signaling tracing configuration information and/or forwards the first signaling tracing configuration information to an HLR/HSS. That is, after receiving the first signaling tracing configuration information, the core network node may store the first signaling tracing configuration information directly, and may also forward the first signaling tracing configuration information to the HLR/HSS directly, or, may also preprocess the first signaling tracing configuration information and then determine whether to forward it to the HLR/HSS. For example, the first core network node may determine whether a context of the user equipment to be specified exists in the core network node, if the context exists, it indicates that the first core network node is a serving core network node of the user equipment and, thus, the first core network node stores the first signaling tracing configuration information; in an embodiment, if the context does not exist, it indicates that the first core network node is not the serving core network node of the user equipment and, thus, the first core network node forwards the first signaling tracing configuration information to the HSS/HLR.

Alternatively, the sending unit 603 is specifically configured to send the first signaling tracing configuration information to at least one first core network node connected with the base station itself, so that the first core network node that receives the first signaling tracing configuration information processes the first signaling tracing configuration information. The processing includes: the first core network node that receives the first signaling tracing configuration information stores the first signaling tracing configuration information if the context of the user equipment exists in the first core network node that receives the first signaling tracing configuration information; or, the first core network node that receives the first signaling tracing configuration information forwards the first signaling tracing configuration information to the HSS/HLR or the serving core network node of the user equipment if the context of the user equipment does not exist in the first core network node that receives the first signaling tracing configuration information.

The first signaling tracing configuration information and the second signaling tracing configuration information may include: configuration parameters for performing signaling tracing, and/or, configuration parameter for performing MDT to collect data. Besides, the first core network node and the serving core network node may be the same core network node, and may also be different core network nodes.

It should be noted that the second signaling tracing configuration information is the same as the signaling tracing configuration information in the prior art, and the second signaling tracing configuration information differs from the first signaling tracing configuration information in that the first signaling tracing configuration information carries a user equipment identifier while the second signaling tracing configuration information may carry the user equipment identifier and may also carry no user equipment identifier.

For detailed implementation of the foregoing units, see the preceding embodiments, which is not detailed here any further.

As revealed in the foregoing description, a collecting unit 601 of a base station in this embodiment may receive first signaling tracing configuration information sent by an OAM device, where the first signaling tracing configuration information carries a user equipment identifier; and then a sending unit 602 sends the first signaling tracing configuration information to a first core network node, and therefore, when signaling tracing is required, second signaling tracing configuration information is provided to a serving base station according to the first signaling tracing configuration information in order to initiate signaling-based MDT configuration. In this way, even in a scenario that the access network and the core network are managed by different OAM devices, the OAM device of the access network can also initiate signaling-based MDT configuration, and multiple MDT configuration modes are provided to the operator for selecting.

For other types of structures and functions of the base station, see the descriptions in the preceding method embodiments.

Embodiment 7

Figure 7A:
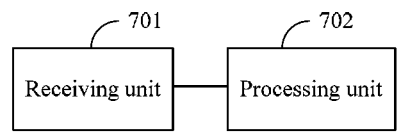
FIG. 7a is a schematic structural diagram of a core network device according to an embodiment of the present invention.

Correspondingly, embodiments of the present invention also provide a core network device, which may serve as a first core network node in embodiments of the present invention. As shown in FIG. 7a, the core network device includes a receiving unit 701 and a processing unit 702.

The receiving unit 701 is configured to receive first signaling tracing configuration information sent by a base station, where the first signaling tracing configuration information carries a user equipment identifier such as an IMSI or IMEI.

At least one user equipment identifier is carried, that is, the carried user equipment identifier may be one user equipment identifier, and may also be a list of user equipment identifiers such as a list of IMSIs or IMEIs.

The processing unit 702 is configured to provide the first signaling tracing configuration information received by the receiving unit 701 to a serving core network node, so that the serving core network node provides second signaling tracing configuration information to a serving base station according to the first signaling tracing configuration information to initiate signaling tracing for a user equipment corresponding to the user equipment identifier.

For example, the processing unit 702 may be specifically configured to perform at least one of the following operations: store the first signaling tracing configuration information received by the receiving unit 701; forward the first signaling tracing configuration information received by the receiving unit 701 to an HLR/HSS; or, send the first signaling tracing configuration information received by the receiving unit 701 to the serving core network node, so as to provide the first signaling tracing configuration information to the serving base station to initiate signaling tracing for the user equipment. For details, see Embodiment 2, which is not detailed here any further.

Figure 7B:
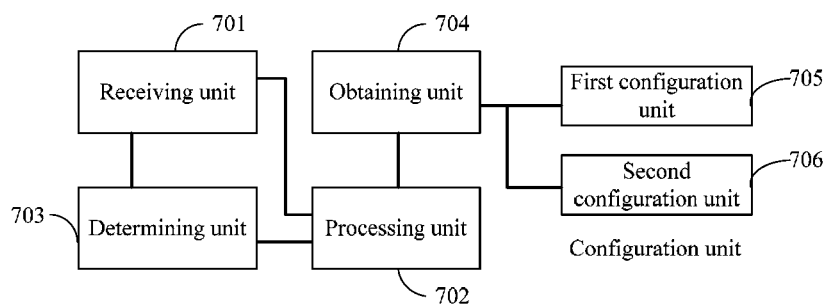
FIG. 7b is another schematic structural diagram of a core network device according to an embodiment of the present invention.

As shown in FIG. 7b, the core network device further includes a determining unit 703.

The determining unit 703 is configured to determine that a context of the user equipment corresponding to the user equipment identifier exists in the core network device; and The processing unit 702 is specifically configured to store the first signaling tracing configuration information if the determining unit 703 determines that the context of the user equipment corresponding to the user equipment identifier exists in the core network device; or The determining unit 703 is configured to determine that the context of the user equipment corresponding to the user equipment identifier does not exist in the core network device; and The processing unit 702 is specifically configured to forward the first signaling tracing configuration information to an HSS/HLR for the HSS/HLR storing the first signaling tracing configuration information; or The determining unit 703 determines that the context of the user equipment corresponding to the user equipment identifier does not exist in the core network device; and The processing unit 702 is specifically configured to obtain a serving core network node identifier of specified user equipment from the HSS/HLR, and forward the first signaling tracing configuration information to the serving core network node according to the serving core network node identifier for the serving core network node storing the first signaling tracing configuration information. For details, see the preceding method embodiment, which is not detailed here any further.

As shown in FIG. 7b, the core network device may further includes an obtaining unit 704, a first configuration unit 705, and a second configuration unit 706.

The obtaining unit 704 is configured to obtain the first signaling tracing configuration information when serving as a serving core network node.

The first configuration unit 705 is configured to obtain second signaling tracing configuration information according to the first signaling tracing configuration information when the user equipment is active, and send an S1 application protocol message that carries the second signaling tracing configuration information to the base station through an S1 connection of the user equipment.

The second configuration unit 706 is configured to obtain the second signaling tracing configuration information according to the first signaling tracing configuration information after receiving an activation message sent by the user equipment when the user equipment is idle or detached, and send an S1 application protocol message that carries the second signaling tracing configuration information to the base station through the S1 connection of the user equipment.

The first signaling tracing configuration information and the second signaling tracing configuration information may include: configuration parameters for performing signaling tracing, and/or, configuration parameter for performing MDT to collect data. Besides, it should be noted that the second signaling tracing configuration information is the same as the signaling tracing configuration information in the prior art, and the second signaling tracing configuration information differs from the first signaling tracing configuration information in that the first signaling tracing configuration information carries a user equipment identifier while the second signaling tracing configuration information may carry the user equipment identifier and may also carry no user equipment identifier.

For detailed implementation of the foregoing units, see the preceding method embodiment, which is not detailed here any further.

Specifically, the core network device may be an MME.

As revealed in the foregoing description, a receiving unit 701 of a core network device in this embodiment may obtain first signaling tracing configuration information carrying a specified user equipment identifier sent by an OAM device of an access network indirectly through a base station, and therefore, even in a scenario that the access network and the core network are managed by different OAM devices, the OAM device of the access network can also initiate signaling-based MDT configuration, and multiple MDT configuration modes are provided to the operator for selecting.

For other types of structures and functions of the core network node, see the descriptions in the preceding method embodiment.

Embodiment 8

Correspondingly, embodiments of the present invention also provides a communication system, including any base station and any core network device provided in embodiments of the present invention, where, the core network device serves as a first core network node.

The base station is configured to receive first signaling tracing configuration information that carries a user equipment identifier to be specified sent by an OAM device, send the first signaling tracing configuration information to a first core network device, receive second signaling tracing configuration information sent by a serving core network node, and initiate signaling tracing for user equipment according to the second signaling tracing configuration information sent by the serving core network node. The first signaling tracing configuration information is used to initiate signaling tracing for the user equipment corresponding to the user equipment identifier, and the second signaling tracing configuration information is obtained by the serving core network node according to the first signaling tracing configuration information provided by the first core network node.

The core network device is configured to receive the first signaling tracing configuration information that carries the user equipment identifier to be specified sent by the base station, provide the first signaling tracing configuration information to the serving core network node, so that the serving core network node provides the second signaling tracing configuration information to a serving base station according to the first signaling tracing configuration information to initiate signaling tracing for the user equipment corresponding to the user equipment identifier.

For example, after receiving the first signaling tracing configuration information, the core network device may store the first signaling tracing configuration information, and/or forward the first signaling tracing configuration information to an HLR/HSS or forward the first signaling tracing configuration information to the serving core network device (that is, a device serving as a serving core network node), so as to initiate signaling tracing for the user equipment. For example, when the user equipment corresponding to the user equipment identifier accesses the network, the serving core network device provides the second signaling tracing configuration information to the serving base station to initiate signaling tracing for the user equipment.

The communication system may further include an HSS or HLR.

The HSS or HLR is configured to receive the first signaling tracing configuration information sent by the core network device, and store the first signaling tracing configuration information.

The HSS or HLR is further configured to provide the first signaling tracing configuration information to the serving core network node (that is, the serving core network device).

Specifically, the user equipment identifier may be an IMSI or IMEI or the like. The carried user equipment identifier may be one user equipment identifier or a list including multiple user equipments such as a list of IMSIs or IMEIs.

The first signaling tracing configuration information and the second signaling tracing configuration information may include: configuration parameters for performing signaling tracing, and/or, configuration parameter for performing MDT to collect data. It should be noted that the second signaling tracing configuration information is the same as the signaling tracing configuration information in the prior art, and the second signaling tracing configuration information differs from the first signaling tracing configuration information in that the first signaling tracing configuration information carries a user equipment identifier while the second signaling tracing configuration information may carry the user equipment identifier and may also carry no user equipment identifier.

For detailed implementation of the foregoing devices, see the preceding method embodiments, which is not detailed here any further.

As revealed in the foregoing description, in the communication system in this embodiment, the first signaling tracing configuration information sent by an OAM device carries a user equipment identifier to be specified, and therefore, even in a scenario that an access network and a core network are managed by different OAM devices, the core network device can also collect the user equipment identifier to be specified by the OAM device of the access network, thereby the OAM device of the access network can also initiate signaling-based MDT configuration, and multiple MDT configuration modes are provided to the operator for selecting.

For other types of structures and functions of the system, see the descriptions in the preceding method embodiments.

Persons of ordinary skill in the art should understand that all or part of the steps of the method in embodiments of the present invention may be implemented by a program instructing relevant hardware. The program may be stored in computer readable storage media. The storage media may be a read-only memory (ROM, Read Only Memory), a random access memory (RAM, Random Access Memory), a magnetic disk, an optical disk, or the like.

Detailed above are a signaling tracing method, apparatus and system according to embodiments of the present invention. Several examples are used for illustration of the principles and implementation methods of the present invention. The description about the above embodiments is only for facilitating the understanding of the method and its core ideas of the present invention. Those skilled in the art can make various modifications and variations to the specific implementations and application scope according to the core ideas of the present invention. In conclusion, the contents in this description should not be interpreted as limitation of the present invention.

What is claimed is:

1. A signaling tracing method, comprising:
receiving, by a base station, first signaling tracing configuration information sent by an operation administration maintenance (OAM) device for initiating a signaling tracing for a user equipment, wherein the first signaling tracing configuration information carries a user equipment identifier corresponding to the user equipment;
sending, by the base station, the first signaling tracing configuration information to a first core network node;
receiving, by a serving base station, second signaling tracing configuration information sent by a serving core network node, wherein the second signaling tracing configuration information is obtained by the serving core network node based on the first signaling tracing configuration information, which is provided to the serving core network node by the first core network node after determining that a context of the user equipment does not exist in the first core network node; and
initiating, by the serving base station, the signaling tracing for the user equipment based on the second signaling tracing configuration information;
wherein the first core network node is different from the serving core network node and the first core network node and the serving core network node are both mobility management entities (MMEs).

2. The method according to claim 1, wherein the first core network node is connected with the base station, and is configured to forward the first signaling tracing configuration information to a Home Subscriber Server (HSS) or a home location register (HLR) or the serving core network node of the user equipment.

3. The method according to claim 1, wherein both the first signaling tracing configuration information and the second signaling tracing configuration information comprise at least one of:
a configuration parameter for performing signaling tracing, and
a configuration parameter for performing minimization of drive test (MDT) to collect data.

4. A signaling tracing method, comprising:
receiving, by a first core network node, first signaling tracing configuration information sent by a base station, wherein the first signaling tracing configuration information carries a user equipment identifier; and
providing, by the first core network node, the first signaling tracing configuration information to a serving core network node after determining that a context of a user equipment corresponding to the user equipment identifier does not exist in the first core network node, wherein the serving core network node provides second signaling tracing configuration information to a serving base station based on the first signaling tracing configuration information, wherein the second signaling tracing configuration information is used to initiate signaling tracing for the user equipment corresponding to the user equipment identifier;
wherein the first core network node is different from the serving core network node and the first core network node and the serving core network node are both mobility management entities (MMEs).

5. The method according to claim 4, wherein the second signaling tracing configuration information is provided to the serving base station as part of an S1 application protocol message sent to the serving base station through an S1 connection between the serving base station and the user equipment.

6. The method according to claim 4, wherein both the first signaling tracing configuration information and the second signaling tracing configuration information comprise at least one of:
a configuration parameter for performing signaling tracing, and
a configuration parameter for performing minimization of drive test (MDT) to collect data.

7. The method according to claim 4, wherein providing the first signaling tracing configuration information to the serving core network node further comprises:
forwarding the first signaling tracing configuration information to at least one of a Home Subscriber Server (HSS) or a home location register (HLR).

8. The method according to claim 4, wherein providing the first signaling tracing configuration information to the serving core network node further comprises:
sending the first signaling tracing configuration information to the serving core network node.

9. The method according to claim 8, wherein sending the first signaling tracing configuration information to the serving core network node of the user equipment further comprises:
obtaining a serving core network node identifier of the user equipment from a Home Subscriber Server (HSS) or a home location register (HLR); and sending the first signaling tracing configuration information to the serving core network node based on the serving core network node identifier.

10. A base station, comprising:
a receiver, configured to receive first signaling tracing configuration information sent by an operation administration maintenance (OAM) device for initiating a signaling tracing for a user equipment, wherein the first signaling tracing configuration information carries a user equipment identifier corresponding to the user equipment;
a transmitter, configured to send the first signaling tracing configuration information to a first core network node;
wherein the receiver is further configured to receive second signaling tracing configuration information sent by a serving core network node of the user equipment, wherein the second signaling tracing configuration information is obtained by the serving core network node based on the first signaling tracing configuration information, which is provided to the serving core network node by the first core network node after determining that a context of the user equipment does not exist in the first core network node; and
a processor, configured to initiate the signaling tracing for the user equipment based on the second signaling tracing configuration information received by the receiver;
wherein the first core network node is different from the serving core network node and the first core network node and the serving core network node are both mobility management entities (MMEs).

11. The base station according to claim 10, wherein the first core network node is connected with the base station, and is configured to forward the first signaling tracing configuration information to a Home Subscriber Server (HSS) or a home location register (HLR) or the serving core network node of the user equipment.

12. A core network device, comprising:
a receiver, configured to receive first signaling tracing configuration information sent by a base station, wherein the first signaling tracing configuration information carries a user equipment identifier; and
a processor, configured to provide the first signaling tracing configuration information received by the receiver to a serving core network node after determining that a context of a user equipment corresponding to the user equipment identifier does not exist in the core network node wherein the serving core network node is configured to provide second signaling tracing configuration information to a serving base station based on the first signaling tracing configuration information to initiate signaling tracing for the user equipment corresponding to the user equipment identifier;
wherein the core network node is different from the serving core network node and the core network node and the serving core network node are both mobility management entities (MMEs).

13. The core network device according to claim 12, wherein the processor is configured to:
obtain the first signaling tracing configuration information when serving as a serving core network node;
obtain the second signaling tracing configuration information according to the first signaling tracing configuration information when the user equipment is active, and send an S1 application protocol message that carries the second signaling tracing configuration information to the serving base station through an S1 connection of the user equipment, so that the serving base station initiates the signaling tracing for the user equipment; and
obtain the second signaling tracing configuration information according to the first signaling tracing configuration information after receiving an activation message sent by the user equipment when the user equipment is idle or detached, and send the S1 application protocol message that carries the second signaling tracing configuration information to the serving base station through the S1 connection connected to the user equipment, so that the serving base station initiates the signaling tracing for the user equipment.

14. The core network device according to claim 12, wherein the core network device is a mobility management entity (MME).

15. The core network device according to claim 12, wherein providing the first signaling tracing configuration information to the serving core network node comprises:
forwarding the first signaling tracing configuration information to at least one of a Home Subscriber Server (HSS) or a home location register (HLR).

16. The core network device according to claim 12, wherein providing the first signaling tracing configuration information to the serving core network node comprises:
sending the first signaling tracing configuration information to the serving core network node.

* * * * *